United States Patent [19]

Dorsch et al.

[11] Patent Number: 5,035,839
[45] Date of Patent: Jul. 30, 1991

[54] COMPOSITIONS FORMING HYDROGEN BRIDGES

[75] Inventors: Dieter Dorsch, Darmstadt; Rudolf Eidenschink, Bodenheim; Bernhard Rieger, Pfungstadt; Gerd Marowsky, Göttingen, all of Fed. Rep. of Germany

[73] Assignee: Merck Patent Gesellschaft mit Beschränkter Haftung, Darmstadt, Fed. Rep. of Germany

[21] Appl. No.: 272,679

[22] PCT Filed: Feb. 8, 1988

[86] PCT No.: PCT/EP88/00091
§ 371 Date: Oct. 17, 1988
§ 102(e) Date: Oct. 17, 1988

[87] PCT Pub. No.: WO88/06304
PCT Pub. Date: Aug. 25, 1988

[30] Foreign Application Priority Data

Feb. 17, 1987 [DE] Fed. Rep. of Germany ....... 3704878

[51] Int. Cl.$^5$ .................... F21V 9/04; C09K 19/52; G02F 1/13
[52] U.S. Cl. .................... 252/587; 252/589; 252/582; 252/299.01; 350/350 R; 350/355; 350/96.3
[58] Field of Search .................... 252/299.01, 582, 587, 252/589, 600; 350/350 R, 350 S, 96.3, 355

[56] References Cited

U.S. PATENT DOCUMENTS

| | | | |
|---|---|---|---|
| 4,199,698 | 4/1980 | Bethea et al. | 307/425 |
| 4,431,263 | 2/1984 | Garito | 350/96.34 |
| 4,719,281 | 1/1988 | Choe | 528/310 |
| 4,774,025 | 9/1988 | Choe et al. | 252/582 |
| 4,775,215 | 10/1988 | Teng et al. | 350/96.34 |
| 4,868,250 | 9/1989 | DeMartino et al. | 252/299.01 X |

FOREIGN PATENT DOCUMENTS

| | | | |
|---|---|---|---|
| 0091838 | 10/1983 | European Pat. Off. | 252/587 X |
| 0232119 | 8/1987 | European Pat. Off. | 252/587 X |
| 0234751 | 9/1987 | European Pat. Off. | 350/1.1 |

OTHER PUBLICATIONS

Buckley, A. et al., S.P.I.E., Apr. 1986 meeting, New York.
Uchida, T. et al., Jap. Jul. Appl. Phys., 11(10), 1559, 1972.
Taratuta, V. G. et al., Mol. Cryst., Liq. Cryst. 116, 245, 1985.
Ledoux, I. et al., Opt. Eng., 25(2), 202, 1986.

*Primary Examiner*—John S. Maples
*Assistant Examiner*—Richard Treanor
*Attorney, Agent, or Firm*—Millen, White & Zelano

[57] ABSTRACT

Composition which form hydrogen bridges are suitable for the preparation of materials of non-linear optical properties.

6 Claims, No Drawings

COMPOSITIONS FORMING HYDROGEN BRIDGES'

SUMMARY OF THE INVENTION

The invention relates to materials of non-linear optical properties in which one layer containing components having a hyperpolarizability of the second order differing from zero is attached to a substrate via hydrogen bridges.

Non-linear optics are concerned with the interaction of electromagnetic fields in various media and with the formation, associated therewith, of new fields having different properties. Materials with non-linear optical properties possess a dielectric susceptibility of the second order which is dependent on the field strength and which is the cause of a number of dispersive processes: frequency doubling (second harmonic generation=SHG) makes it possible to produce light of half the wavelength in comparison with the incident light; the electro-optical effect (Pockels effect) makes it possible to alter the refractive index when an electric field is applied; and methods of sum and difference frequency mixing and also frequency division permit the continuous tuning of laser light.

A large number of technical applications results from the effects listed above. Electro-optical switch gear, the control of frequency and intensity in laser technology, holography and the realms of information processing and integrated optics constitute fields of use for materials having non-linear optical properties of the second order.

Materials having electrical susceptibility functions of the third order are suitable for the production of purely optical switch gear and hence as waveguides for the construction of purely optical computers.

In order to be suitable for use in the field of non-linear optics of the second order, materials of this type must meet a number of requirements.

In addition to a non-centrosymmetrical molecular arrangement within the crystal, suitability for technical use requires the highest possible values of dielectric susceptibility $X^{(2)}$.

A number of inorganic substances, such as, for example, potassium dihydrogenphosphate or lithium niobate, exhibit non-linear optical properties. However, all these compounds suffer from a very wide variety of disadvantages. In addition to insufficient values of dielectric susceptibility of the second order, inorganic compounds are frequently deficient in adequate photostability when subjected to treatment at high intensities of light, or they can only be prepared and processed with difficulty.

Organic compounds of the nitroaniline type are known from Garito et al., Laser Focus 18 (1982) and from EP 0,091,838. However, their relatively good values of photochemical stability and dielectric susceptibility of the second order are accompanied by poor crystallizability and inadequate mechanical stability. In particular, it is not possible to use these materials to prepare thin layers such as are required by integrated optics.

Polymers are distinguished by high resistance to mechanical stress and good stability towards chemicals. Molecules which have non-linear optical properties and are fastened to the polymer skeleton or dissolved in polymers should, therefore, display advantageous values of dielectric susceptibility in the non-centrosymmetrical environment.

Polymers having non-linear properties of the second order can be prepared by applying an external field to films which are doped with statistically oriented molecules and have been heated above the glass transition temperature. This results in a polarity in the intercalated molecules, which imparts anisotropy to the polymer medium when the latter has solidified. Polymers prepared in this manner which have non-linear optical properties and in which p,p'-dimethylaminonitrostilbene is used as the host molecule, have been described by Meredith et al., Macromolecules 15 (1982) 1385.

Shibaev et al., Polymer Communications 24 (1983) 364, report the field-induced orientation of liquidcrystal polymers having mesogenic side groups.

U.S. Pat. No. 4,412,059 discloses a polymer material having cholesteric mesophases which are accessible to controlled orientation by means of electric or magnetic fields. Finally, fully aromatic, thermotropic, liquidcrystal polymers whose non-linear optical properties can also be evoked by means of external fields are known from EP 0,172,012.

Another method of producing polymer materials having non-linear optical properties consists in polymerizing monomers which are already oriented and have a noncentrosymmetrical orientation, the state of order of the system being substantially retained during the polymerization. Monomers suitable for this technique are given, for example, in EP 0,021,695.

DE-A1 3,624,858 describes polymer materials having non-linear properties, which consist of polar monomer units and in which the polymer main chains have an orientation vertical to the surface of the substrate. However, the preparation of polymer materials of this type requires that either the initiator which brings about the polymerization or the polymerized monomers should be chemically anchored on the surface of the substrate, which requires an additional process stage.

There is, therefore, a need for materials which have non-linear optical properties and which do not display the disadvantages described, or do so only to a slight extent, and which, in particular, can be applied to substrates in a non-centrosymmetrical arrangement without chemical anchoring.

This object is achieved by means of the materials of non-linear optical properties according to the invention.

It has now been found, surprisingly, that compounds which have a hyperpolarizability of the second order differing from zero and which are attached to the surface of a substrate via hydrogen bridges and which form, via hydrogen bridges, one or more subsequent layers superimposed thereon are excellently suitable for the preparation of materials of non-linear optical properties.

The invention therefore relates to a material of non-linear optical properties which consists of at least one component having a hyperpolarizability of the second order differing from zero and which is applied to a surface, characterized in that the components having a hyperpolarizability of the second order differing from zero are attached to the surface of the substrate via hydrogen bridges and one or more subsequent layers situated on top of the layer covering the substrate are also attached to one another via hydrogen bridges.

The invention also relates to the use of these materials as media of non-linear optical properties.

The capacity to form hydrogen bridge bonds is known in the case of a large number of solids having polar structural constituents (cf., for example, Hamilton, Ibers: Hydrogen Bonding in Solids; New York: Benjamin, 1968).

Measurements of the non-linear susceptibility of the second order of substrates attached to glass surfaces by hydrogen bridges are already known. Thus N. E. van Wyck et al. have, as described in Chem. Phys. Lett. 122, 153 (1985), vapor-deposited inter alia p-cresol in vacuo onto a quartz sheet and have examined the nature of the adsorption by means of SHG (second harmonic generation) spectroscopy. They concluded, on the basis of the absorption layers, that hydrogen bridge bonds had been formed. This paper does not, however, give any indication that multiple layers attached via hydrogen bridges afford good materials having non-linear optical properties.

Examples of suitable compounds, according to the invention, which form hydrogen bridges are the compounds listed in Hamilton, Ibers, loc. cit. Preferably they have dipolar substituents, and donor substituents, such as, for example, hydroxy, alkoxy, amino, monoalkylamino and dialkylamino substituents, and acceptor substituents, such as, for example, cyano, nitro, carboxyl, alkoxycarbonyl and nitrogen present in aromatic systems, are particularly suitable. Thus, for example, the nitrogen-containing six-membered ring compounds described in DE-A1 3,641,024 are particularly suitable components for the preparation of the materials, of non-linear optical properties, according to the invention.

Examples of substrates suitable for the formation of hydrogen bridges are glass, quartz, plastics, particularly plastics having polar end groups, such as, for example, polyvinyl alcohols, or modified metal surfaces. These substrates can, in addition, also be converted into functional derivatives, for example by means of reactive silanes in the manner described by Deschler et al., Angew. Chem 98 (1986) 237.

Substrates coated in this manner with materials having a hyperpolarization differing from zero exhibit a preferably dipolar orientation of the layer components. When several such layers are applied one above the other, the subsequent layers therefore preferably undergo the same dipolar orientation as the layer covering the substrate.

By virtue of their capacity to form oriented phases in the liquid state, liquid-crystal substances also prove suitable for the preparation of the materials of non-linear optical properties, according to the invention. Liquid-crystal compounds which are particularly suitable for this purpose are those containing one or more of the donor and/or acceptor substituents indicated above.

Finally, polymers which are capable of forming hydrogen bridge bonds and have a hyperpolarizability differing from zero are also suitable for the preparation of the materials of non-linear optical properties, according to the invention. In this regard, the polymeric structure can already be present before application to the substrate, or a material equipped with polymerizable groups is first applied to the substrate and is subsequently polymerized with the retention of the non-linear optical properties. In both cases the polymerization can, for example, be carried out by the processes indicated in C. M. Paleos et al., J. Polym. Sci. Polym. Chem. Ed., 19 (1981) 1427; or Ocian: Principles of Polymerization, McGraw-Hill, New York.

The compositions according to the invention which form hydrogen bridges are excellently suitable for use as media of non-linear optical properties. Their preparation is effected, for example, by applying the compounds indicated above to a substrate in a dissolved or liquid form, for example by brushing, printing, dipping or whirler-coating. Non-linear optical structures which open up a wide field of use by virtue of their advantageous properties are obtained in this manner. They are particularly suitable for doubling the frequency of laser light and for the production of circuit elements, waveguides and phase modulators in the field of integrated optics.

EXAMPLES

The following examples serve to illustrate the invention:

EXAMPLE 1

4-Amin ⓒ-4''-nitro-p-terphenyL is melted (299 ° C.) on a microscope slide so as to form a liquid layer approx. 100 μm thick. This layer is liquid-crystalline/-nematic and, when irradiated obliquely with light from an Nd-YAG laser, exhibits partial frequency doubling of the incident light.

EXAMPLE 2

A liquid-crystal nematic layer having non-linear optical properties is obtained analogously to Example 1 by melting a 1:1 mixture of 4-(4-hydroxybutoxy)-4'-cyanobiphenyl and 4-(2-hydroxyethoxy)-4'-cyanobiphenyl.

EXAMPLE 3

A sheet of glass is covered with a thin layer of 4-{2-[4'-(6-hydroxyhexyloxy)-biphenyl-4'-yl]-ethenyl}-pyridine by being dipped into a concentrated solution of this compound in methylene chloride. The resulting layer exhibits good non-linear optical properties.

EXAMPLE 4

(a) A solution of 929 mg of dicyclohexylcarbodiimide in 10 ml of methylene chloride is added dropwise to a mixture, kept at 0 ° C., of 15 g of 2-(11-methacryloylundecyl)-hydroquinone, 12.6 g of 2-(4-(2-[4]pyridylvinyl)-phenoxy)-acetic acid, 4.4 g of triethylamine, 0.5 g of dimethylaminopyridine and 2 mg of 2,6-di-tert-butyl-4-methylphenol in 100 ml of methylene chloride, and the mixture is stirred for 18 hours at room temperature. The precipitate is filtered off, the filtrate is concentrated and the residue is chromatographed. 4-Hydroxy-3-(11-methacryloyloxyundecyl)-phenyl 2-(4-(2-[4]-pyridyl-vinyl)-phenoxy)-acetate is obtained in the form of yellow crystals.

(b) A solution of 303 mg of dicyclohexylcarbodiimide in 5 ml of methylene chloride is added dropwise to a solution, kept at 0 ° C., of 8.2 g of the methacrylate prepared in Example 4a, 2.55 g of 4-(2-hydroxyethoxy)-benzoic acid and 1 mg of 2,6-di-tert-butyl-4-methylphenol in 30 ml of methylene chloride, and the mixture is stirred for 18 hours at room temperature. The precipitate is filtered off, the filtrate is concentrated and the residue is chromatographed. 3-(11-Methacryloyloxyundecyl)-4-(4-(2-hydroxyethoxy)-benzoyloxy)-phenyl 2-(4-(2-[4]-pyridyl-vinyl)-phenoxy)-acetate is obtained in the form of yellowish crystals.

EXAMPLE 5

A solution of 3.75 g of the methacrylate obtained in accordance with Example 4 and 17 mg of azobisisobutyronitrile in 20 ml of N-methylpyrrolidone is kept at 60° C. for 20 hours. The polymer is reprecipitated twice from ethanol. This gives a yellow, pulverulent polymer. The polymer is dissolved in N-methylpyrrolidone and is applied to a glass substrate by spin coating. This gives a transparent, yellowish polymer film which has waveguide properties and non-linear optical properties of the second order. Thus the frequency of light passing within this polymer film is in part doubled in frequency.

EXAMPLE 6

A sheet of glass is coated with a layer of the monomer and photoinitiator by being dipped in a solution of the monomer prepared in accordance with Example 4 and a photoinitiator (for example 2-hydroxy-2-methyl-1-phenylbutan-1-one). This layer is irradiated with UV light at a temperature of 100° C. A transparent, yellowish polymer film having non-linear optical properties is formed.

We claim:

1. A composition having non-linear optical properties comprising:
   a substrate;
   a first layer containing at least one component having a hyperpolarizability of the second order differing from zero and which is applied to the surface of said substrate, wherein said at least one component of said first layer contains at least one donor substituent capable of forming a hydrogen bridge and at least one acceptor substituent capable of forming a hydrogen bridge, and wherein said at least one component of said first layer has a dipolar orientation and is attached to the surface of the substrate via a hydrogen bridge; and
   at least one subsequent layer containing at least one component having a hyperpolarizability of the second order differing from zero situated on top of said first layer applied to said substrate, wherein said at least one component of said subsequent layer contains at least one donor substituent capable of forming a hydrogen bridge and at least one acceptor substituent capable of forming a hydrogen bridge, said at least one component of said subsequent layer has a dipolar orientation, and wherein said layers are also attached to one another via hydrogen bridges,
   wherein said at least one component of each of said layers is independently 4-amino-4''-nitro-p-terphenyl, 4-(4-hydroxybutoxy)-4'-cyanobiphenyl, 4-(2-hydroxyethoxy)-4'-cyano-biphenyl, 4-{2-]4'-(6-hydroxyhexyloxy)-biphenyl-4'-yl]-ethenyl}-pyridine, 4-hydroxy-3-(11-methacryloyloxyundecyl)-phenyl 2-(4-(2-[4]-pyridylvinyl)-phenoxy)-acetate or 3-(11-methacryloyl-oxyundecyl)-4-(4-(2-hydroxyethoxy)-benzoyloxy)-phenyl 2-(4-(2-[4]-pyridylvinyl)-phenoxy)-acetate.

2. A composition according to claim 1, wherein said substrate is glass, quartz, plastic or metal.

3. A composition according to claim 2, wherein said substrate is a plastic having polar end groups.

4. A composition according to claim 3, wherein said plastic is made of polyvinyl alcohols.

5. In a device for exhibiting non-linear optical effects comprising means for subjecting a media to an electromagnetic field, said media capable of exhibiting non-linear optic effects when exposed to an electromagnetic field, the improvement wherein said media is a composition of claim 1.

6. In a method of inducing non-linear optical effects comprising means for subjecting a media capable of exhibiting non-linear optical effects to an electromagnetic field, the improvement wherein said media is a composition of claim 1.

* * * * *